(12) United States Patent
Edlund et al.

(10) Patent No.: US 6,979,507 B2
(45) Date of Patent: Dec. 27, 2005

(54) FUEL CELL SYSTEM CONTROLLER

(75) Inventors: David J. Edlund, Bend, OR (US);
Thomas G. Herron, Bend, OR (US);
Craig F. Holmes, Bend, OR (US)

(73) Assignee: IdaTech, LLC, Bend, OR (US)

( * ) Notice: Subject to any disclaimer, the term of this patent is extended or adjusted under 35 U.S.C. 154(b) by 111 days.

(21) Appl. No.: 10/304,786

(22) Filed: Nov. 25, 2002

(65) Prior Publication Data

US 2003/0113601 A1 Jun. 19, 2003

Related U.S. Application Data

(63) Continuation of application No. 09/626,311, filed on Jul. 26, 2000, now Pat. No. 6,495,277.

(51) Int. Cl.[7] .............................................. H01M 8/04
(52) U.S. Cl. ........................................ 429/23; 429/19
(58) Field of Search .............................. 429/17, 19, 22, 429/23, 25, 34, 26, 9; 702/57, 60, 63

(56) References Cited

U.S. PATENT DOCUMENTS

| 3,765,946 A | 10/1973 | Werner et al. |
| 3,857,735 A | 12/1974 | Louis et al. |
| 3,955,941 A | 5/1976 | Houseman et al. |
| 4,000,003 A | 12/1976 | Baker et al. |
| 4,098,959 A | 7/1978 | Fanciullo |
| 4,098,960 A | 7/1978 | Gagnon |
| 4,310,605 A | 1/1982 | Early et al. |
| 4,349,613 A | 9/1982 | Winsel |
| 4,351,405 A | 9/1982 | Fields et al. |
| 4,377,445 A | 3/1983 | Grimes |
| 4,390,602 A | 6/1983 | Struthers |
| 4,472,176 A | 9/1984 | Rubin |
| 4,533,607 A | 8/1985 | Sederquist |
| 4,553,981 A | 11/1985 | Fuderer |
| 4,642,273 A | 2/1987 | Sasaki |
| 4,657,828 A | 4/1987 | Tajima |
| 4,781,241 A | 11/1988 | Misage et al. |
| 4,788,004 A | 11/1988 | Pinto et al. |
| 4,820,594 A | 4/1989 | Sugita et al. |
| 4,839,246 A | 6/1989 | Takabayashi |
| 4,839,574 A | 6/1989 | Takabayashi |
| 4,883,724 A | 11/1989 | Yamamoto |
| 4,904,548 A | 2/1990 | Tajima |
| 4,946,667 A | 8/1990 | Beshty |
| 4,981,676 A | 1/1991 | Minet et al. |

(Continued)

FOREIGN PATENT DOCUMENTS

EP 0752731 B1 1/1997

(Continued)

OTHER PUBLICATIONS

Edlund, David J. and William A. Pledger, "The Practical Use of Metal-Membrane Reactors for Industrial Applications," The 1995 Membrane Technology Reviews, pp. 89-97 (Nov., 1994).

(Continued)

*Primary Examiner*—Raymond Alejandro
(74) *Attorney, Agent, or Firm*—Kolisch Hartwell, P.C.

(57) ABSTRACT

A fuel cell system that includes a control system for regulating the power produced by the fuel cell system. The fuel cell system includes a fuel cell stack adapted to produce electrical power from a feed. In some embodiments, the fuel cell system includes a fuel processing assembly adapted to produce the feed for the fuel cell stack from one or more feedstocks. The control system regulates the power produced by the fuel cell system to prevent damage to, and/or failure of, the system.

39 Claims, 7 Drawing Sheets

U.S. PATENT DOCUMENTS

| | | |
|---|---|---|
| 4,988,283 A | 1/1991 | Nagasawa et al. |
| 5,006,846 A | 4/1991 | Granville et al. |
| 5,030,661 A | 7/1991 | Lywood |
| 5,139,894 A | 8/1992 | Mizuno et al. |
| 5,154,986 A | 10/1992 | Takechi et al. |
| 5,200,278 A | 4/1993 | Watkins |
| 5,229,222 A | 7/1993 | Tsutsumi et al. |
| 5,334,463 A | 8/1994 | Tajima et al. |
| 5,354,547 A | 10/1994 | Rao et al. |
| 5,366,818 A | 11/1994 | Wilkinson et al. |
| 5,366,821 A | 11/1994 | Merritt et al. |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,462,815 A | 10/1995 | Horiuchi |
| 5,478,662 A | 12/1995 | Strasser |
| 5,509,942 A | 4/1996 | Dodge |
| 5,527,632 A | 6/1996 | Gardner |
| 5,624,768 A | 4/1997 | Tanokura |
| 5,631,532 A | 5/1997 | Azuma et al. |
| 5,631,820 A | 5/1997 | Donnelly et al. |
| 5,637,414 A | 6/1997 | Inoue et al. |
| 5,658,681 A | 8/1997 | Sato et al. |
| 5,677,073 A | 10/1997 | Kawatsu |
| 5,705,916 A | 1/1998 | Rudbeck et al. |
| 5,712,052 A | 1/1998 | Kawatsu |
| 5,714,276 A | 2/1998 | Okamoto |
| 5,763,113 A | 6/1998 | Meltser et al. |
| 5,771,476 A | 6/1998 | Mufford et al. |
| 5,780,179 A | 7/1998 | Okamoto |
| 5,795,666 A | 8/1998 | Johnssen |
| 5,798,186 A | 8/1998 | Fletcher et al. |
| 5,821,185 A | 10/1998 | White et al. |
| 5,846,669 A | 12/1998 | Smotkin et al. |
| 5,861,137 A | 1/1999 | Edlund |
| RE36,148 E | 3/1999 | Strasser |
| 5,897,766 A | 4/1999 | Kawatsu |
| 5,897,970 A | 4/1999 | Isomura et al. |
| 5,927,416 A | 7/1999 | del Re et al. |
| 5,929,538 A | 7/1999 | O'Sullivan et al. |
| 5,932,181 A | 8/1999 | Kim et al. |
| 5,964,309 A | 10/1999 | Kimura et al. |
| 5,985,474 A | 11/1999 | Chen et al. |
| 5,989,739 A | 11/1999 | Zur Megede et al. |
| 5,991,670 A | 11/1999 | Mufford et al. |
| 5,997,594 A | 12/1999 | Edlund et al. |
| 5,998,053 A | 12/1999 | Diethelm |
| 6,001,499 A | 12/1999 | Grot et al. |
| 6,007,931 A | 12/1999 | Fuller et al. |
| 6,013,385 A | 1/2000 | DuBose |
| 6,022,634 A | 2/2000 | Ramunni et al. |
| 6,042,956 A | 3/2000 | Lenel |
| 6,045,772 A | 4/2000 | Szydlowski et al. |
| 6,045,933 A | 4/2000 | Okamoto |
| 6,054,229 A | 4/2000 | Hsu et al. |
| 6,083,637 A | 7/2000 | Walz et al. |
| 6,096,449 A | 8/2000 | Fuglevand et al. |
| 6,103,410 A | 8/2000 | Fuller et al. |
| 6,120,923 A | 9/2000 | Van Dine et al. |
| 6,165,633 A | 12/2000 | Negishi |
| 6,214,484 B1 | 4/2001 | Hauer |
| 6,221,117 B1 | 4/2001 | Edlund et al. |
| 6,242,120 B1 | 6/2001 | Herron |
| 6,245,214 B1 | 6/2001 | Rehg et al. |
| 6,348,278 B1 | 2/2002 | LaPierre |
| 6,413,661 B1 * | 7/2002 | Clingerman et al. ........... 429/17 |
| 6,421,593 B1 | 7/2002 | Kempen et al. |
| 6,423,203 B1 | 7/2002 | Faita et al. |
| 6,451,467 B1 * | 9/2002 | Peschke et al. ............... 429/23 |
| 6,458,477 B1 | 10/2002 | Hsu |
| 6,522,955 B1 | 2/2003 | Colborn |
| 6,537,690 B1 | 3/2003 | Karrupaiah et al. |
| 6,703,722 B2 | 3/2004 | Christensen |
| 6,764,782 B2 | 7/2004 | Raiser et al. |
| 6,887,607 B1 * | 5/2005 | Scholten et al. .............. 429/26 |
| 2005/0119842 A1 | 6/2005 | Clingerman et al. |

FOREIGN PATENT DOCUMENTS

| | | |
|---|---|---|
| EP | 1065741 A2 | 1/2001 |
| JP | 60-30062 | 2/1985 |
| JP | 4-163860 | 6/1992 |
| WO | WO 98/56058 | 12/1998 |
| WO | WO 99/65097 | 12/1999 |
| WO | WO 00/02282 | 1/2000 |
| WO | WO 00/04600 | 1/2000 |

OTHER PUBLICATIONS

Nadal, et al., "Development of a Hybrid Fuel Cell/Battery Powered Electric Vehicle," *International Journal of Hydrogen Energy*, vol. 21, No. 6, pp. 497-505, Jun. 1, 1996.

Oertel, Michael, et al., "Steam Reforming of Natural Gas with Integrated Hydrogen Separation for Hydrogen Production," Chemical Engineering Technology, vol. 10, pp. 248-255, 1987.

Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.

Privette et al., "Status of SOFCo SOFC Technology Development," presented at the 1996 Fuel Cell Seminar held Nove. 17-20, 1996 in Orlando, Florida, pp. 206-209.

English language abstract, Japanese Patent No. 6176779 A, 1994.

English language abstract, Japanese Patent No. 11116202 A, 1995.

English abstract of German language PCT Patent Application Serial No. WO 97/43796, 1997.

English language abstract, Japanese Patent No. 7057758 A, 1999.

English-language abstract of Japanese Patent No. JP 63-236269, 1999.

English-language abstract of Japanese Patent No. JP 2-168803, 1999.

English language abstract, German language PCT Patent Application Serial No. WO 00/04600, 2000.

English-language abstract of Japanese Patent No. JP 60-30062, 1985.

English-language abstract of PCT International Publication No. WO 98/56058, 1998.

* cited by examiner

US 6,979,507 B2

FUEL CELL SYSTEM CONTROLLER

RELATED APPLICATION

This application is a continuation application claiming priority to U.S. patent application Ser. No. 09/626,311, which was filed on Jul. 26, 2000, issued on Dec. 17, 2002 as U.S. Pat. No. 6,495,277, is entitled "Fuel Cell System Controller," and the complete disclosure of which is hereby incorporated by reference for all purposes.

FIELD OF THE INVENTION

The invention relates generally to fuel cell systems, and more particularly to a controller for fuel cell systems and fuel cell systems incorporating the same.

SUMMARY OF THE INVENTION

A fuel cell is a device that converts hydrogen gas into electrical power through an electrochemical reaction. A fuel cell stack is several fuel cells coupled together into one unit. When one of the cells in a fuel cell stack is damaged, it affects the performance of the entire stack, typically by causing the entire stack to fail.

A fuel cell or fuel cell stack may be incorporated into a fuel cell system, which also includes a fuel processor, such as a steam reformer. The system may also include a battery bank, which stores produced electrical power, and an air source, which delivers oxygen to the fuel cell. In such a system, there is a need to control the delivery of power from the fuel cell to prevent damage thereto. There is also a need for a control system to regulate the operation of the system to prevent damage thereto and to optimize the operation thereof responsive to applied loads.

The present invention provides such a control system, which may be used to meet both of these needs, either together or separately.

Many features of the present invention will become manifest to those versed in the art upon making reference to the detailed description which follows and the accompanying sheets of drawings in which preferred embodiments incorporating the principles of this invention are disclosed as illustrative examples only.

DETAILED DESCRIPTION AND BEST MODE OF THE INVENTION

Figure 1:
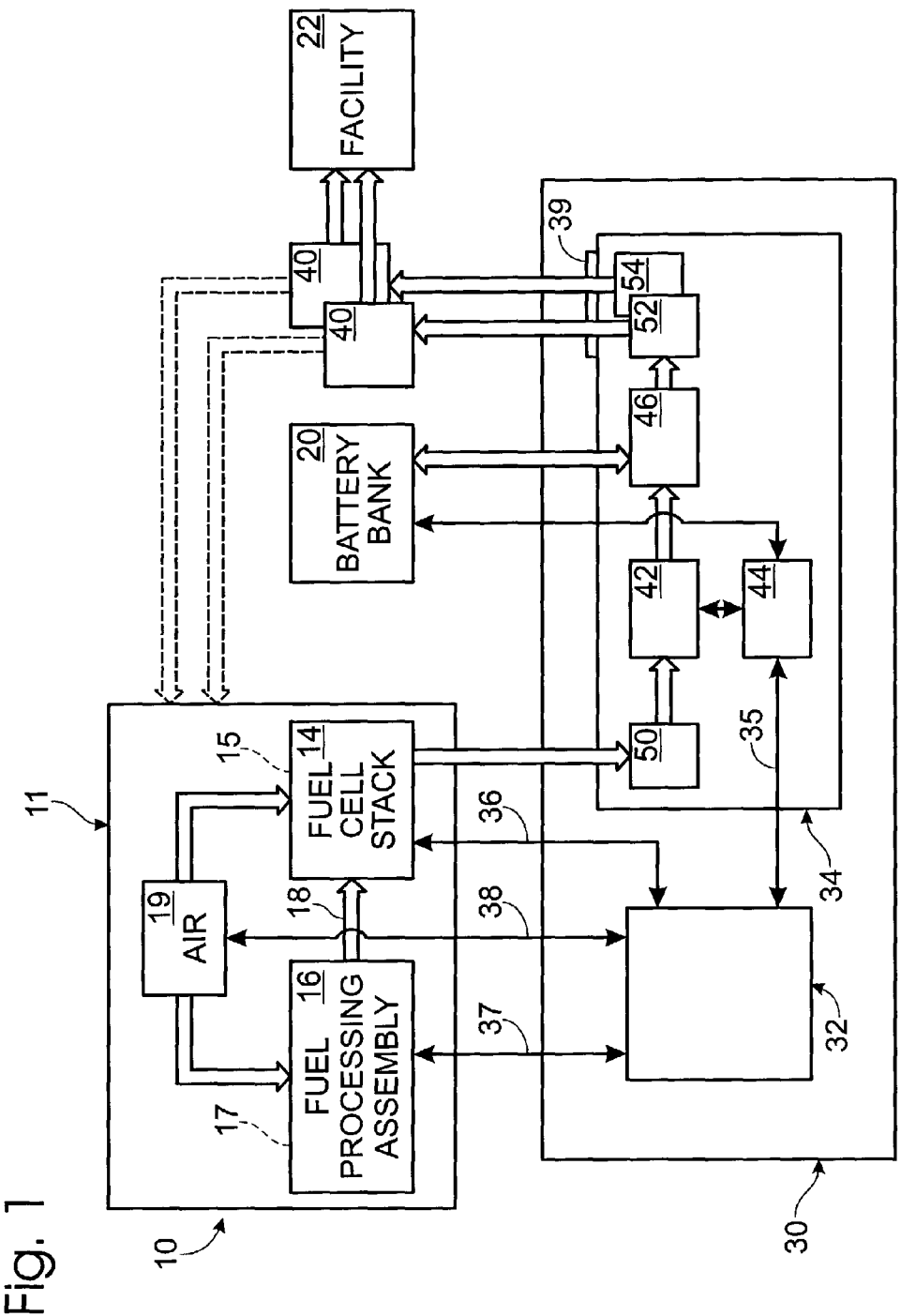
FIG. 1 is a schematic diagram of a fuel cell system including a control system according to the present invention.

A fuel cell system is shown in FIG. 1 and generally indicated at 10. System 10 includes a fuel cell stack 14 and a fuel processing assembly 16. Fuel cell stack 14 is adapted to produce electrical power from a feed, and fuel processing assembly 16 is adapted to produce a corresponding feed stream 18 for the fuel cell stack from one or more feedstocks. A suitable feed stream is a stream containing, or at least substantially formed from, hydrogen gas, although others may be used as well, depending for example upon the configuration and structure of fuel cell stack 14. As used herein the fuel processing assembly and fuel cell stack are collectively referred to as a fuel processing system and are generally indicated at 11 in FIG. 1. System 11 further includes associated pumps, fluid transport lines, feed storage and/or delivery equipment and related devices.

Fuel cell stack 14 includes one or more fuel cells 15, typically in the form of a fuel cell stack 14 that includes a plurality of fuel cells operatively coupled together. Although referred to herein as a fuel cell stack, it is within the scope of the present invention that fuel cell stack 14 may include only a single fuel cell, a plurality of separately operational fuel cells, or a plurality of separately operational or interconnected fuel cell stacks. Examples of suitable fuel cells include proton exchange membrane (PEM) fuel cells and alkaline fuel cells.

Figure 8:
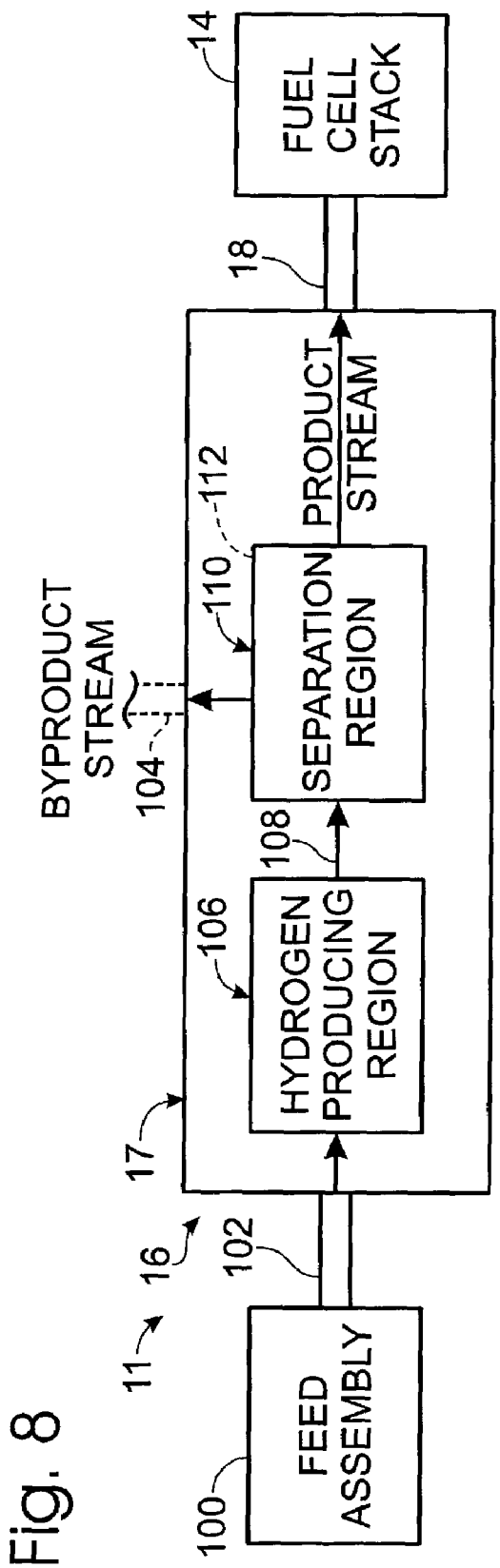
FIG. 8 is a schematic diagram of a fuel processing assembly.

System 10 includes a fuel processing assembly 16, which includes one or more fuel processors 17. An example of a suitable fuel processor is a steam reformer, which produces hydrogen gas through a thermo-chemical reaction, typically involving a feedstock comprising an alcohol or a hydrocarbon. Examples of suitable steam reformers are disclosed in U.S. Pat. Nos. 5861,137, 5,997,594, and 6,221,117, the disclosures of which are hereby incorporated by reference. A schematic diagram of a suitable fuel processing assembly 16 is shown in FIG. 8. As shown, fuel processing assembly 16 includes a feed assembly 100 that is adapted to deliver one or more feed streams 102 to a fuel processor 17. Fuel processor 17 receives the feed streams and produces product hydrogen stream 18 therefrom. In addition to product hydrogen stream 18, fuel processor 17 may also produce one or more byproduct streams 104. These byproduct streams may be utilized for fuel, heat exchange, or feed. Alternatively, these streams may be harvested for use in other applications.

Fuel processor 17 includes a hydrogen producing region 106, in which a hydrogen-containing stream, or mixed gas stream, 108 is produced from the feed streams. The hydrogen-containing stream typically contains impurities, and therefore is delivered to a separation region, or purification region, 110, where the stream is purified. In the separation region 110, the hydrogen-containing stream is separated into product hydrogen stream 18 and a byproduct stream 104. Separation region 110 includes a membrane module 112, which contains one or more hydrogen permeable metal membranes, such as membranes formed from palladium and palladium alloys.

An example of a membrane module 112 formed from a plurality of hydrogen-selective metal membranes is disclosed in U.S. Pat. No. 6,221,117, which was filed on Apr. 13, 1999, is entitled "Fuel Processing System," and the complete disclosure of which is hereby incorporated by reference. In that application, a plurality of generally planar membranes are assembled together into a membrane module having flow channels through which an impure gas stream is delivered to the membranes, a purified gas stream is harvested from the membranes and a byproduct stream is removed from the membranes.

It is within the scope of the present invention that fuel processing assembly 16 may include any suitable device or assembly of devices for producing a stream of hydrogen gas. Examples of other suitable mechanisms that may be used to produce hydrogen gas stream 18 are by autothermal reforming, by partial oxidation of a hydrocarbon or alcohol vapor, by a combination of partial oxidation and steam reforming a hydrocarbon or an alcohol vapor, by pyrolysis of a hydrocarbon or alcohol vapor, and by electrolysis of water. It should be understood that the feedstock for fuel processor 12 will vary depending upon the particular form of fuel processor being used. For example, when fuel processor 17 produces hydrogen through steam reforming, the feedstock will typically include water and an alcohol or hydrocarbon. Autothermal reforming will also include a water component or stream as a part of the feedstock, however, pyrolysis and partial oxidation will not.

In FIG. 1, system 10 is shown including an air source 19, such as a blower or compressor, to supply air to the fuel processing assembly and the fuel cell stack. Air source 19 may be one or more separate units, or it may be incorporated into the fuel cell stack and/or the fuel processing assembly. It should be understood that some embodiments of the invented fuel cell system may not include an air source 19. For example, fuel processing assembly 16 may not have an air stream delivered to it. Similarly, fuel cell stack 14 may have an oxygen gas stream, as opposed to an air stream, delivered to it.

Hydrogen gas produced by fuel processing assembly 16 and oxygen from air source 19 are delivered to fuel cell stack 14, which produces electrical power and water therefrom. The electrical power produced by fuel cell stack 14 is either used to meet electrical loads or stored in battery bank 20. Examples of devices that may draw power from the fuel cell stack include the subsequently described facilities 22, as well as the fuel cell system itself, which draws power for its own electrically powered components. As used herein, a device drawing power from the fuel cell system may also be referred to as the device applying a load to the system.

System 10 further includes a battery bank 20, which stores electrical power produced by fuel cell stack 14. Bank 20 includes one or more batteries or other suitable devices adapted to store electrical power. Battery bank 20 may be used to augment the power provided by cell stack 14, or alternatively, may be used to meet power demands when fuel processing assembly 16 and fuel cell stack 14 are not being used to produce electrical power. Battery bank 20 has a maximum charge, or maximum amount of stored power, and at any particular time has a current level of charge ranging between no stored power and the maximum amount of stored power.

Typically, fuel cell stack 14 and battery bank 20 communicate with and thereby meet the electrical load of one or more power-consuming facilities 22, such as residential, commercial or industrial structures and devices. Examples of such facilities include houses and other dwellings, commercial and small industrial buildings, automobiles, buses, recreational and commercial vehicles, boats, microwave towers, electrical signs and signaling devices, relay stations for communications, such as mobile phones, and any other device which could be powered by a generator or any other source of electrical energy.

Under normal operating conditions, system 10 will meet the power requirements of facility 22. However, problems may arise when the system is unable to meet the load demanded by the facility alone or in combination with other power-consuming devices, such as the balance of plant components described herein. The problems occur because the maximum amount of electrical power available from a fuel cell stack per unit time is finite, but the applied electrical load may exceed the capacity of the system. When this occurs, there are two typical outcomes. The first is that the fuel processing assembly and/or air source cannot meet the fuel cell stack's demands for hydrogen and oxygen needed to meet the applied electrical load (produce the demanded power). This situation results in the fuel cell stack essentially being starved for reactants, which results in the electrical power produced by the fuel cell stack decreasing to zero.

Figure 2:
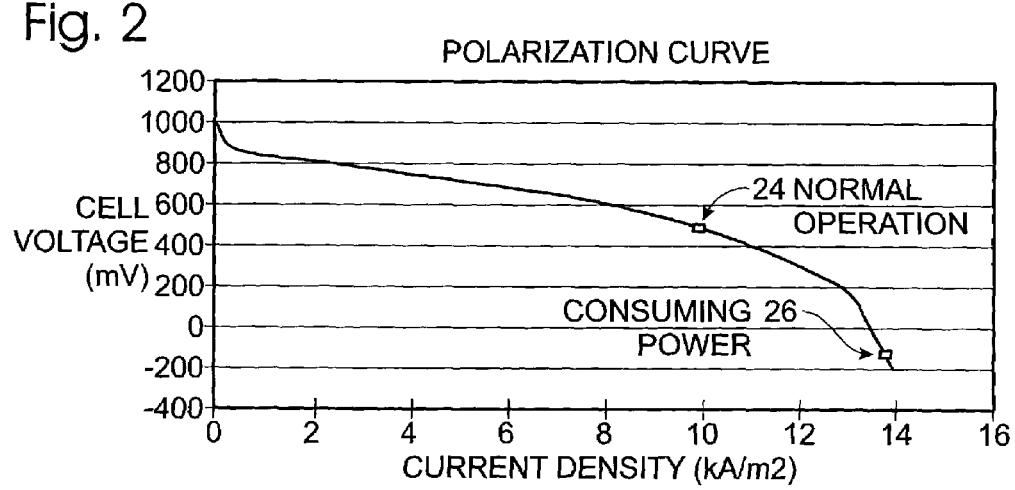
FIG. 2 is a graphical polarization curve for a fuel cell showing cell voltage plotted as a function of current density.

The other outcome occurs when the fuel processing assembly and air source are able to supply sufficient hydrogen and oxygen to the fuel cell stack for the fuel cell stack to exceed its rated output of electrical power responsive to the applied load. The result of this second outcome can perhaps be explained in more detail by referring to the polarization curve shown in FIG. 2, in which cell voltage is plotted as a function of current density. Since fuel cell stack 14 is composed of several like cells, the curve is representative of all cells' performance.

As the demand for electrical power increases, the current increases and the individual fuel cell voltage decreases. For example, a representative operating condition is shown at 24, which is within the rated operational range of the individual fuel cell. As the current continues to increase, the cell potential can even become negative, such as indicated at 26. When this occurs, the cell is consuming power and irreparable damage to the individual fuel cell will occur in a matter of seconds. As stated before, damage to just one individual fuel cell may cause the entire fuel cell stack to fail.

Neither of these outcomes is desirable. From the end user viewpoint, both of the above conditions are system failures simply because no power is being delivered. However, one can appreciate how much more expensive and destructive the second outcome is, compared to the first outcome. In the first outcome, the fuel cell stack turns off safely as it is starved for reactants. In the second outcome, the stack operates outside of the operating parameters for which it was designed.

To prevent either of these outcomes from occurring, system 10 further includes a control system 30, which protects fuel cell stack 14 from having greater than its rated power output drawn therefrom, while also regulating the production of hydrogen from fuel processing assembly 16 to meet the hydrogen demands of the fuel cell stack. Therefore, the control system provides two-fold control of the fuel cell system. It is within the scope of the present invention, however, that each type of subsequently described controller may have separate utility and may be utilized independent of the other type of controller, even though the preferred embodiment of the invention incorporates both controllers into control system 30.

Control system 30, which may also be referred to as a control circuit, controls the demand for electrical power in the form of electrical loads placed on the system without causing damage to fuel cell stack 14. It does this by actively controlling the amount of power drawn from the fuel cell stack by monitoring the voltage and current in the fuel cell stack. System 30 also ensures efficient generation of power by monitoring and controlling the production of the hydrogen in the fuel processor and the available supply of oxygen.

As shown in FIG. 1, control system 30 includes a fuel processing system controller 32 and a charge controller 34.

While controllers 32 and 34 may be implemented as a unit or separately, they will be described separately herein for purposes of illustration. The controllers communicate with each other via linkage 35. Of course, when the controllers are implemented as a single unit, no such linkage is needed. It should be understood that control system 30 may include one or more analog or digital circuits or processors, and may include one or more discrete units in communication with each other. Control system 30 may also include or communicate with sensors, switches, and other electrical and/or mechanical circuits, sensors, feedback mechanisms, and the like.

As shown in FIG. 1, fuel processing system controller 32 communicates with fuel cell stack 14, fuel processing assembly 16, and air source 19 via linkages 36, 37 and 38, respectively. Linkages 36–38 preferably enable two-way communication with the controller, thereby enabling the controller to measure or monitor selected values, or selected variables, of units 14–19, while also controlling the operation of these units, typically responsive to the measured values. Examples of values that may be monitored for fuel processing assembly 16 are the mode of operation of the fuel processor or fuel processors 17 forming fuel processing assembly 16, the supply of feedstock, the rate at which hydrogen gas is being produced and the operating temperature of the fuel processor(s). Typical modes of operation for fuel processing assembly 16 are start-up, shutdown, idle, normal (active), and off. Monitored values for fuel cell stack 14 include the voltage and current within the stack and/or individual cells 15, as well as the applied load. An example of a monitored value for the air source is the rate at which air is being supplied to the fuel processing assembly and the fuel cell stack. When air source 19 is incorporated into either or both of the fuel processing assembly and/or fuel cell stack, its operation and measurement will typically be incorporated into the corresponding linkage for the unit into which it is incorporated.

It should be understood that not all of these values are necessarily essential, and that other values may be measured as well, depending on the particular requirements and configuration of the fuel cell system, the complexity of the system and the desired level of control, and particular user preferences. It should be further understood that the linkages may include any suitable interface and/or sensor for effecting the desired monitoring and control.

Charge controller 34 regulates the storage and output of electrical power produced by fuel cell stack 14. As shown in FIG. 1, charge controller 34 is adapted to deliver the produced electrical power to battery bank 20 for storage, deliver the power for use by facility 22, and/or deliver the power to fuel processing system 11.

Charge controller 34 receives electrical power from fuel cell stack 14, and includes an output 39 through which electrical power is delivered to facility 22. The produced electrical power is often, but not necessarily, delivered to one or more dc to ac inverters 40 before being received by facility 22 or delivered to fuel processing system 11 to run its balance of plant electronics. As used herein, balance of plant components refers generally to the pumps, electrically powered sensors, and other electrical devices associated with fuel processing system 11.

It is within the scope of the present invention that inverters 40 may be omitted, such as when facility 22 is adapted to receive dc power. Examples of such a facility include battery chargers, recreational boats and microwave relay stations. Inverters 40 may also be included within charge controller 34 or facility 22. Two inverters are shown in FIG. 1, however as discussed above, system 10 may include as few as zero or one inverter, or may include multiple inverters, depending upon the requirements of the particular system and the facility or facilities to which it provides electrical power.

In FIG. 1, charge controller 34 is shown including a charging unit 42, which may utilize a three-stage pulse-width-modulated method or any other suitable method for charging battery bank 20. Controller 34 also includes a processor 44 that communicates with fuel processor controller 32. Typically this communication includes receiving control signals therefrom and returning monitoring and feedback signals thereto. Charging unit 42 draws power from fuel cell stack 14 responsive to control signals from control system 30. Typically the control signals are sent by controller 32 responsive to the rate of production of hydrogen in fuel processing assembly 16. Therefore, the amount of power drawn by charging unit 42 is regulated, including being limited, responsive to the available supply of hydrogen for fuel cell stack 14. The amount of power drawn from fuel cell stack 14 is also regulated by charge controller 34, via charging unit 42, to ensure that the rated output of fuel cell stack 14 is not exceeded.

Charge controller 34 also includes an electrical bus 46 interconnecting charging unit 42, battery bank 20 and output 39. Battery bank 20 should be configured to correspond to the voltage of the fuel cell stack output and the inverter input. Charge controller 34 may also include various circuit breakers or other switches, safety mechanisms, contactors, sensors and feedback loops in communication with processor 44. For example, as shown in FIG. 1, controller 34 includes an input breaker 50 that is preferably rated at a determined amount greater than the maximum rated power output of fuel cell stack 14. Typically breaker 50 is rated at between approximately 105% and approximately 150% of the maximum rated output of fuel cell stack 14, with ranges between approximately 110% and approximately 135% being preferred and a value of 125% (per current National Electrical Code (NEC) regulations based on the power output of the fuel cell system) proving effective in experimental tests. Other ratings may be used, such as required by local, state or other codes and regulations. Breaker 50 may also include a contactor in communication with processor 44.

Should a spike of electrical power be received from fuel cell stack 14 that exceeds this threshold above the stack's rated maximum output, breaker 50 will be actuated, thereby stopping the delivery of electrical power to charge controller 34. Preferably, breaker 50 communicates with fuel processing system controller 32 (either directly or through charge controller 34) to indicate when the breaker has been actuated. Upon receipt of such a signal, controller 32 can then adjust the operation of fuel cell stack 14 and/or fuel processing assembly 16 accordingly to prevent damage to the system.

Also shown in FIG. 1 is a pair of output breakers 52 and 54. Output breakers 52 and 54 are preferably rated for the power capacity of inverters 40. Although plural output breakers are shown in FIG. 1, it is within the scope of the present invention that one or more such breakers may be used. For example, the number of breakers may correspond to the number of inverters being used. Output breakers 52 and 54 protect the inverters from receiving electrical power that exceeds the capacity of the inverters. Breakers 52 and 54 may also include contactors. Alternatively, breakers 52 and 54 may instead be contactors.

The elements of charge controller 34 are preferably in communication with processor 44, which in turn is in communication with controller 32. This enables the control system to monitor and direct the operation of the individual elements described herein. Direct communication with controller 32 is also within the scope of the invention. It should be understood that two-way communication is not required for all elements, and that some elements may only have one-way (either monitoring or control) communication, or no communication at all. For example, the breakers will typically have no direct communication with control system 30. However, it is within the scope of the invention that any or all of the breakers may be associated with a contactor. The contactors may have only monitoring communication so that the control system can detect when any of the breakers are actuated and direct the operation of the fuel cell system accordingly. However, two-way communication may be preferred to allow increased control of the fuel cell system. For example, two-way communication with the contactors would allow the control system to cause the actuation of the breakers, which may be necessary in emergency situations or when an element of the system is malfunctioning or not communicating with the control system.

The operation of fuel cell system 10 will now be described in more detail, starting from a position in which battery bank 20 is uncharged and fuel processing assembly 16 is turned off. After fuel processing assembly 16 completes its start-up mode and reaches a desired operating temperature, the fuel processing assembly begins producing hydrogen gas, which is delivered to fuel cell stack 14. Stack 14 receives the flow of hydrogen gas from fuel processing assembly 16 and a flow of oxygen (typically in the form of air) from air source 19, and produces electrical power therefrom. This power is delivered to charge controller 34. The power passes through input breaker 50 to charging unit 42 and then to electrical bus 46.

From bus 46, the power travels either to battery bank 20 or output 39, as dictated by Ohm's and/or Kirchhoff's laws. Therefore, if there is an electrical load being applied to the system, such as from facility 22, the power produced will be outputted to meet the demand. If the power production exceeds the demand, or if there is no demand, the produced power is stored in battery bank 20. Once battery bank 20 is fully charged, a signal is sent to controller 32, which in turn directs fuel processing assembly 16 to shift to an idle, or reduced-output, mode of operation. In this mode of operation, the fuel processor essentially maintains its operating temperature and other conditions while only producing minimal hydrogen. This nominal flow of hydrogen is converted to electrical power used to operate fuel cell system 10 and to maintain the battery bank at a full state of charge. Because its operating conditions are maintained, fuel processing assembly 16 can be quickly ramped up to its normal hydrogen-producing mode of operation without requiring the start-up time and procedure required if the fuel processor had been turned off. Therefore, the fuel processor can respond relatively quickly to changes in the hydrogen demands of the system.

When battery bank 20 is fully charged and fuel processing assembly 16 is turned off or in an idle mode of operation, any electrical load applied to the system will be satisfied from battery bank 20. The status, or level or charge, of battery bank 20 is monitored by control system 30, either by charge controller 34 or fuel processing assembly controller 32. When the charge decreases to a selected minimum level, controller 32 directs fuel processing assembly 16 to resume its normal hydrogen-producing mode of operation. Typically, this entails either shifting from its idle mode to its normal mode, or from its off mode to its start-up and then normal modes of operation. If fuel processing assembly 16 is already in its normal mode of operation when this minimum level is reached, control system 30 limits the amount of power drawn on fuel cell stack 14 to prevent damage to the fuel cell stack, such as would occur if the applied load exceeds the system's capacity. For example, controller 32 may direct charge controller 34 to limit the rate at which the charging unit delivers power to bus 46.

The minimum level of charge at which control system 30 directs fuel processing assembly 16 to be in its normal mode of operation should be selected as a function of such factors as the time required for the fuel processor to reach its normal mode of operation, the remaining charge of battery bank 20, the magnitude of the applied load, etc. Therefore, the minimum level of charge may vary depending upon the particular mode of operation of the fuel processor. Because the fuel processor will reach its normal mode of operation much quicker from its idle, warmed-up mode than when the fuel processor is turned off, it follows that a higher minimum level is required when the fuel processor is turned off. Basically, the minimum value should be selected to ensure that the fuel processor will reach its normal mode of operation before the charge of the battery bank is depleted (or reaches a selected base level of charge).

Preferably, the minimum charge value includes a buffer to provide a safety margin in case of such factors as human or other errors, delays in the fuel processor reaching its normal operating mode, increases in the applied load, etc. The buffer may be a percentage of a theoretical minimum level of charge, such as in the range of approximately 10% and approximately 100% of the theoretical minimum level, with values in the range of approximately 25% and approximately 75% being preferred and a value of approximately 50% of the theoretical minimum level of charge proving sufficient. For example, if a 20% level of charge is determined to be the theoretical minimum level of charge needed to provide power to meet an applied load until fuel cell stack 14 can produce additional power, a value of 30% may be used by control system 30 to provide a safety buffer.

System 30 may utilize a single minimum charge value selected to provide sufficient time for fuel processing assembly 16 to reach its normal operating mode regardless of its current state of operation. Such a value would be determined as the required level of charge of battery bank 20 to meet the maximum applied load for the time necessary for fuel processing assembly 16 to reach its normal operating mode from a cold start. With a single minimum charge value selected to be sufficient for all operating conditions, it follows that, under most operating conditions the battery bank will have more than a sufficient safety margin from being depleted. System 30 may also utilize multiple and different minimum charge values that reflect the energy use patterns of facility 22, as discussed in more detail below.

Once control system 30 directs fuel processing assembly 16 to shift to its normal operating mode and that operating mode is reached, fuel processing assembly 16 begins producing hydrogen, which enables fuel cell stack 14 to produce additional electrical power. The newly produced power travels via the previously described path to bus 46, where it may be used to meet the applied load, recharge battery bank 20, or both. Essentially, the power will follow the path of least resistance from bus 46, with between none and all of the power going to the battery bank and the output of the charge controller, depending on the current charge of the battery bank and applied load.

An important feature of fuel processor controller 32 is that it prevents more than the maximum rated power from being produced by fuel cell stack 14, thereby preventing both of the previously described system failures. Therefore, when the applied load is greater than the maximum power production of fuel cell stack 14, the control system limits the production of electrical power to prevent the fuel cell stack from exceeding its rated maximum. It should be understood that the maximum production defined by fuel processor controller 32 may be some value other than the rated maximum production rate of fuel cell stack 14. For example, it may be desirable to limit production to a value less than the rated maximum, such as 95%, 90% or other values less than the maximum.

Control system 30 also may limit the rate at which fuel cell stack 14 produces electrical power responsive to the capability of fuel processing assembly 16 and air source 19 to provide the fuel cell stack with the required feeds of hydrogen and oxygen. Therefore, if only 75% of the feedstock required to meet the fuel cell stack's theoretical maximum output is available, then the fuel cell controller may limit the production of electrical power to the current production rate/availability of hydrogen and oxygen.

As described above, control system 30 limits the production of electrical power to ensure that the fuel cell stack does not exceed its rated maximum output or the availability of hydrogen or oxygen feedstock, such as from fuel processing assembly 16, air source 19 or another suitable source. In order words, the control system limits the portion of the applied load that is applied to the fuel cell stack. However, this does not mean that fuel cell system 10 cannot safely meet, at least temporarily, loads that exceed the maximum rated output of fuel cell stack 14. Because battery bank 20 stores electrical power, it essentially creates a power reserve that can be used in place of newly produced electrical power, as described above, or as a supplement to the produced electrical power. Therefore, if the applied load exceeds the capacity of fuel cell stack 14, the battery bank can also supply power to meet this load.

The actual distribution of the load met by fuel cell stack 14 and battery bank 20 may vary, depending on such factors as the magnitude of the applied load, the remaining charge of the battery bank, the operating mode of the fuel processor, etc. Of course, it is possible for an applied load to exceed the combined total output of fuel cell stack 14 and battery bank 20. Should this occur, control system 30 will prevent too much power from being drawn from the fuel cell stack, thereby preventing damage to any component of the system.

Another way to describe the relationship between control system 30 with respect to the fuel processing assembly, fuel cell stack and the facility or other electrical power consuming device is as follows:

Fuel processing assembly 16 has a maximum production rate of stream 18, and a currently available production rate of stream 18. The maximum production rate of stream 18 is the maximum rate at which the fuel processing assembly can produce stream 18 within rated, or safe, operating conditions assuming an abundant supply of all necessary feedstock. The currently available production rate of stream 18 is the rate at which stream 18 can be produced by the fuel processing assembly at the particular time in question.

Fuel processing assemblies typically have an off or shutdown configuration, an on or operating configuration, and sometimes include an idle or standby configuration. In the off or shutdown configurations, the fuel processing is not consuming any feedstock, is not producing any output streams and is at an ambient temperature. In the on or operating configurations, the fuel processing assembly is consuming feedstock and producing output stream 18 within its operating parameters (temperature, pressure, etc.) In the standby or idle configuration, the fuel processor is only consuming enough feedstock, and thereby producing a corresponding stream 18) to maintain the fuel processor at or near the operating parameters for its on or operating configurations.

In the on configuration, the currently available production rate of stream 18 is that rate at which stream 18 is actually being produced, while in the off and idle configurations, the currently available production rate is zero and near zero, respectively. The currently available production rate of all three configurations theoretically can be increased up to the maximum production rate, however, the time required to reach this maximum or maximum available rate will differ between these configurations. In all three configurations, the maximum production rate of stream 18 is the same.

The fuel cell stack has a maximum rated power output and a currently available power output. The maximum rated power output is the maximum power output of the stack at safe operating conditions and assuming an abundant feed, such as stream 18. The currently available power output is the power fuel cell stack 14 is capable of producing based upon its current feed, namely stream 18. Therefore, the currently available power output is dependent upon the rate at which stream 18 is supplied, and therefore may be controlled by varying the flow rate of stream 18.

Finally, the fuel cell system also has a maximum rated system power output and a currently available system power output. The maximum rated system power output is the total of the maximum rated power output of the fuel cell stack(s) and the maximum charge (maximum stored power) or the battery bank. The currently available system power output is the combination of the currently available power output of the fuel cell stack(s) and the current level of charge (current stored power) of battery bank 20.

If the production rate demanded by fuel cell stack 14 exceeds the maximum production rate of stream 18, the fuel processing assembly simply cannot provide the feed requirements of fuel cell system 14. On the other hand, if the production rate demanded by fuel cell stack exceeds the currently available production rate of stream 18, the fuel processing assembly cannot meet the feed requirements of the fuel cell system 14 unless and until the currently available production rate is increased or the feed requirements are decreased.

Responsive to various stored and/or measured values, control system 30 regulates the power produced by fuel cell system 10 to failure of, or damage to, the system. This regulating may include limiting the amount of power produced. It may also include causing a component of the system to change its currently available rates. For example, control system 30 may direct fuel processing assembly 16 to produce more hydrogen gas, thereby increasing the currently available power output of fuel cell stack 14 and fuel cell system 10. Control system 30 may also limit the rate at which stream 18 is produced to lower the currently available power output of the fuel cell stack, and thereby lower the currently available power output of the fuel cell system. Control system may also adjust the currently available power output of fuel cell stack 14 to either increase the power drawn from battery bank 20 or to increase the current level of charge (stored power) in the battery bank. The interaction and operations of control system 30 are described in more detail herein.

Figure 3:
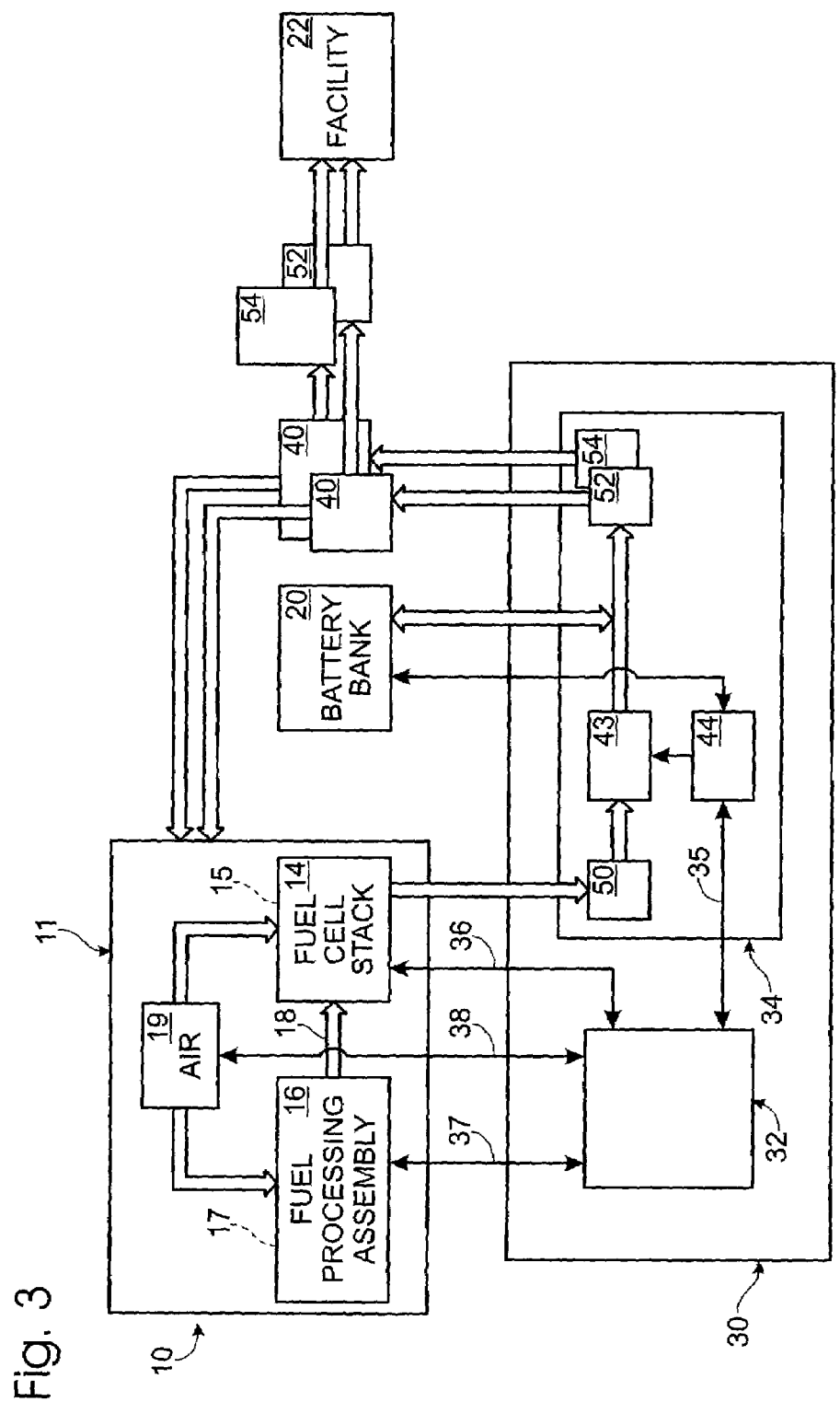
FIG. 3 is a schematic diagram of another embodiment of the fuel cell system of FIG. 1.
Figure 4:
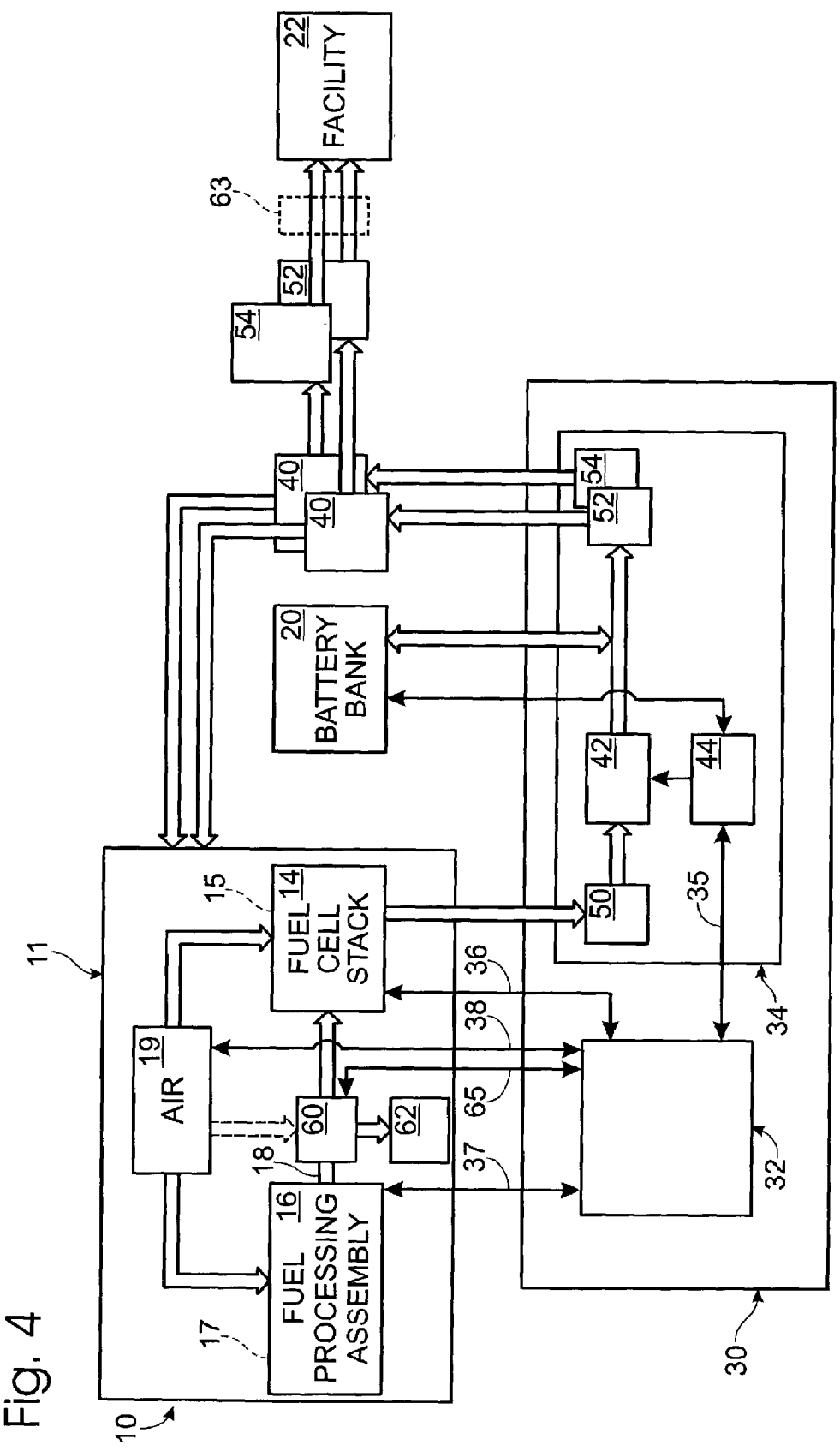
FIG. 4 is a schematic diagram of another embodiment of the fuel cell system of FIG. 3.

Another embodiment of control system 30 is shown in FIG. 3. As shown, charge controller 34 includes a step-up converter 43 in place of the charging unit 42 and dc bus 46 shown in FIG. 1. It should be understood that the embodiments of the fuel cell system shown in the subsequently discussed FIGS. 4–6 may include either the step-up converter of FIG. 3 or the charging unit and dc bus of FIG. 1.

Fuel cell system 10 also provides thermal energy, namely from fuel processing assembly 16, which may be harvested to meet the thermal energy requirements of facility 22. Because fuel processing assembly 16 normally operates at an elevated temperature of at least 200° C., and generally operates in a range of between approximately 200° C. and approximately 700° C., one can appreciate that this thermal energy may be used to meet the thermal load of facility 22. For example, the thermal energy may be used to heat water or another fluid, such as oil or air, which can then be used for heating facility 22, or other attached or adjacent facilities.

Another way to meet thermal loads is to produce electrical power and then deliver the power to a resistor assembly 63 to obtain heat. Assembly 63 typically will include one or more resistors. Yet another way is to burn the produced hydrogen to produce heat, which can be harvested directly or through heat exchange to satisfy the thermal demands being placed on system 10. For example, in FIG. 4 system 10 is shown including a bypass 60 through which hydrogen gas produced by fuel processing assembly 16 is delivered to a combustion chamber 62 instead of being delivered to fuel cell stack 14. Combustion chamber 62 may include a combustion catalyst, burner, igniter, or any other suitable mechanism for combusting the hydrogen gas delivered thereto. Combustion chamber 62 may include an air source. When an air source is desirable, air source 19 may also be used to provide a flow of air to the combustion chamber. Yet another way to meet thermal loads is to simply increase the supply rate of fuel to be consumed in fuel processing assembly 16, which will increase the operating temperature of the fuel processor.

Bypass 60 enables hydrogen gas to be harvested from the fuel processor without producing electrical power therefrom. This is particularly useful when the produced electrical power would otherwise overcharge battery bank 20 because the produced power exceeds the load applied by facility 22 and the power necessary to charge battery bank 22. Bypass 60 may accept none, all, or any portion therebetween of the hydrogen produced by fuel processing assembly 16. For example, in FIG. 4, bypass 60 is shown communicating via linkage 65 with fuel processing system controller 32, which may monitor and control the portion of the produced hydrogen that is sent to combustion chamber 62. By controlling the amount of hydrogen being delivered to fuel cell stack 14, it is possible for fuel processing assembly 16 to operate at its normal full rate of hydrogen production, even though battery bank 20 and facility 22 do not require the amount of power that would otherwise be produced by the produced hydrogen. Instead, the excess hydrogen may be harvested for other applications. This may also include storing the produced hydrogen for later use or for transportation to other systems or hydrogen-consuming applications.

System 10 may be optimized responsive to the average demands of facility 22 over time. With this knowledge, the system can automatically ramp up or down to efficiently meet the demands of the facility. For example, control system 30 may be programmed with the electrical and/or thermal demands of facility 22 as a function of time. These demands may be preprogrammed based on past performance, experimental or theoretical measurements, average demands for similar facilities, etc.

For example, if facility 22 has high energy demands (electrical and/or thermal) for a three-hour time period each day, control system 30, and typically fuel processor controller 32, may be programmed to ramp up fuel processing assembly 16 in sufficient time for system 10 to supply this demand. Preferably, this advance planning for regular demands can enable the fuel cell system to efficiently meet these demands without having to limit the production of power because of a problem that could have been overcome with advance planning. For example, fuel processing assembly 16 should be ramped up to its normal mode of operation in sufficient time to ensure that battery bank 20 is fully charged prior to the high-demand period and that fuel processing assembly 16 is ready to meet the hydrogen demands of fuel cell stack 14.

As another example, facility 22 may have recurring high thermal energy demands during another time period. To anticipate these demands, controller 32 may cause fuel processing assembly 16 to ramp up (i.e., increase the supply rate of fuel and feedstock) prior to this time period to produce heat, which may be harvested through heat exchange with fuel processing assembly 16, to produce additional hydrogen, which may be combusted to produce additional heat, and/or to produce additional electrical power, which may be passed to a resistor to produce heat. By anticipating the recurring electrical and thermal demands of facility 22, control system 30 enables the fuel cell system to efficiently meet these demands. Furthermore this anticipation may even enable system 10 to meet demands that otherwise would exceed the capacity of the system. For example, if facility 22 has a period of recurring thermal and electrical demands, the thermal demands can be lessened or met through heat exchange or heat production other than from power delivered to facility 22. By replacing some or all of the thermal demands with heat generated by fuel processing assembly 16, the system can use its full electrical capacity to meet the applied electrical load, something that otherwise may not have been possible if some of this power was used to satisfy the facility's thermal load.

Figure 5:
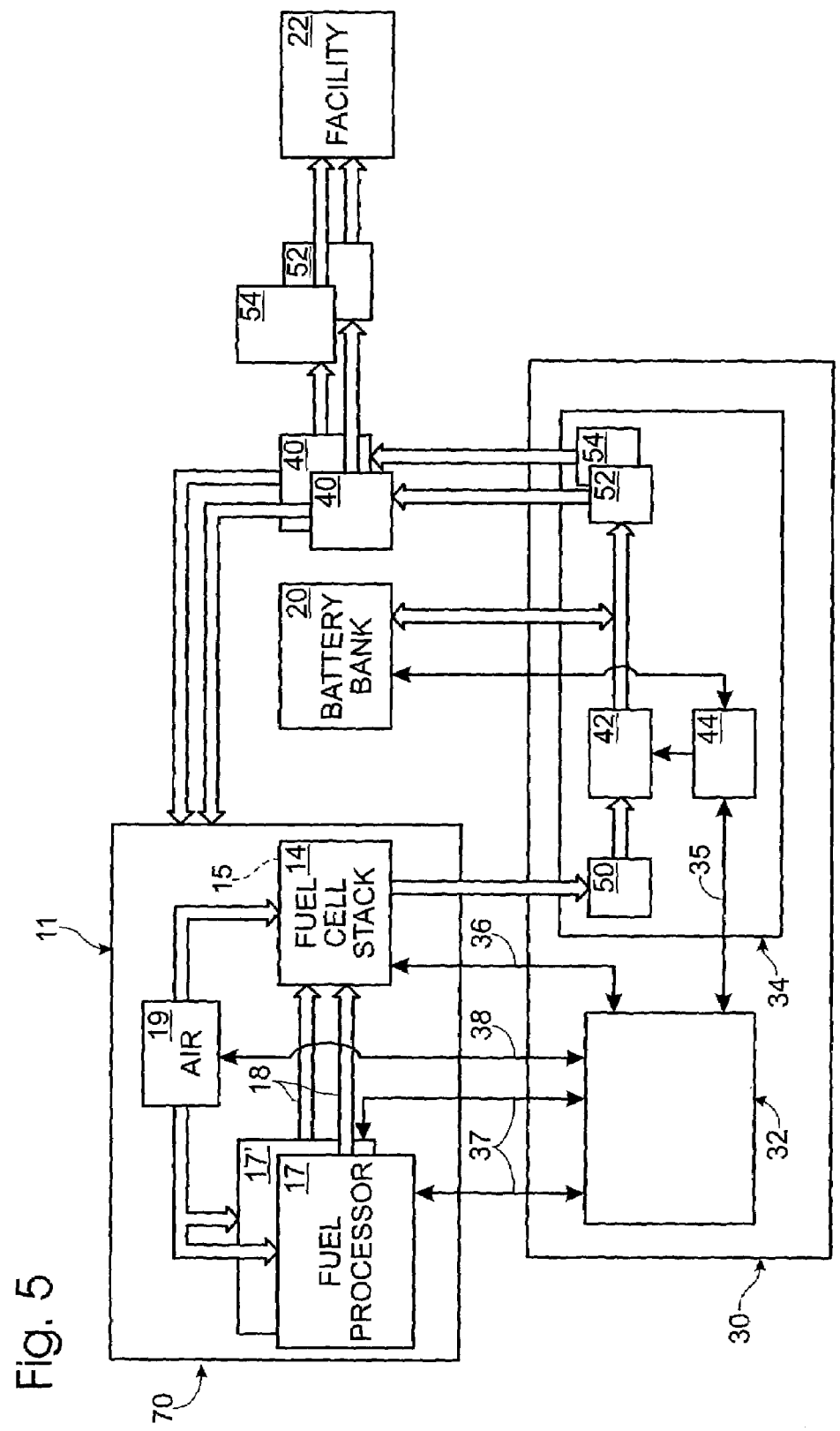
FIG. 5 is a schematic diagram of another embodiment of the fuel cell system of FIG. 3.

As discussed, the fuel cell system may include more than one fuel processor. An example of such a system is shown in FIG. 5 and indicated generally at 70. Unless otherwise specified, system 70 includes the same elements, subelements and possible variations as the previously described fuel cell system 10. System 70 differs from system 10 in that plural fuel processors 17 and 17' are coupled to a single fuel cell stack 14. It should be understood that system 70 may include more than two fuel processors. For example, it may be desirable to have at least one more fuel processor than necessary to meet any hydrogen demands of fuel cell stack 14. This enables the system to continue operating at up to its maximum rated capacity even if one of the fuel processors is not functioning correctly or is turned off for maintenance or repairs.

Of course, having plural fuel processors in normal operating mode will increase the capability of the system to produce hydrogen, which also enables plural fuel cell stacks to be used to convert this hydrogen to electrical power. When the capacity to produce hydrogen exceeds the hydrogen requirements of the fuel cell stack or stacks, the remaining hydrogen may be stored, such as in a hydride bed or storage vessel/tank, burned for fuel, or transported to another hydrogen-consuming device.

Figure 6:
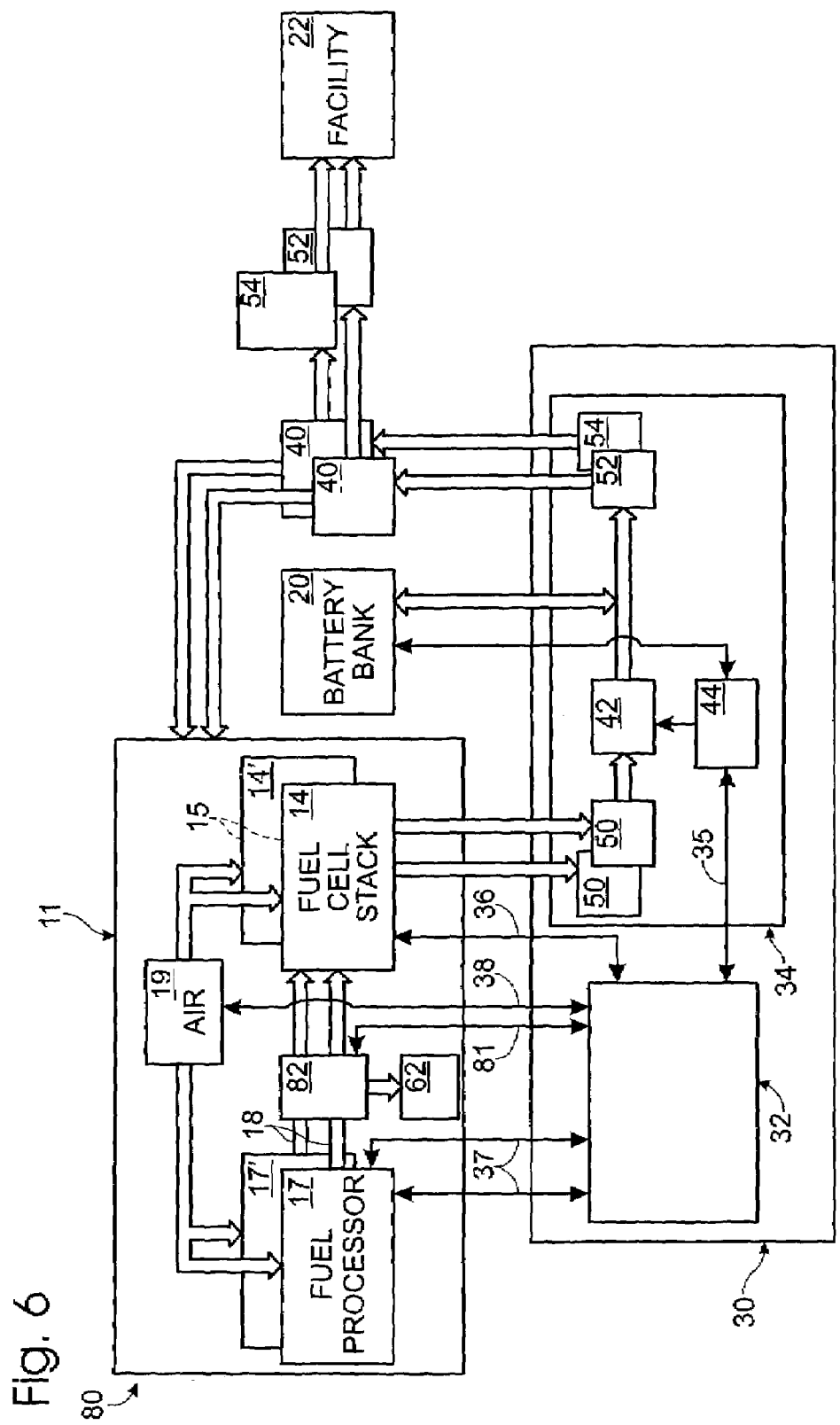
FIG. 6 is a schematic diagram of another embodiment of the fuel cell system of FIG. 3.

As discussed above, the fuel cell system may include a plurality of fuel cell stacks 14. For example, in FIG. 6 two fuel cell stacks 14 and 14' are shown, each of which may include one or more fuel cells 15, and typically include a plurality of fuel cells. When multiple fuel cell stacks are used, they may be connected in series, parallel, or combinations of both to provide a manageable level of current. When more than one fuel cell stack is utilized, such as shown for example in FIG. 6, the system (generally indicated at 80) may include a distribution manifold 82, which regulates the flow of hydrogen from the one or more fuel processors to the one or more fuel cell stacks. As shown in FIG. 6, manifold 82 communicates with controller 32 via linkage 81, which enables the controller to monitor and direct the distribution of hydrogen from the fuel processors. Manifold 82 may also selectively deliver hydrogen to combustion chamber 62, if the particular embodiment of the fuel cell system includes or is in communication with a combustion chamber. Although two fuel processors and fuel cell stacks are shown in FIG. 6, it should be understood that the system may include more than two of each unit as well, and that it may include differing numbers of each type of unit.

Figure 7:
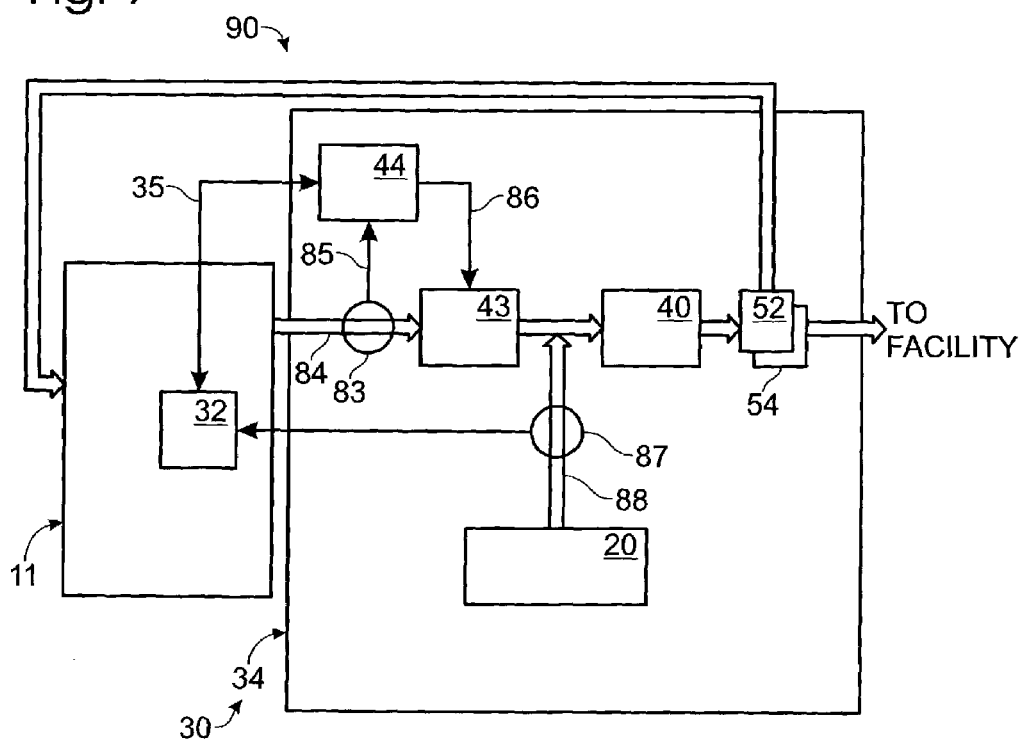
FIG. 7 is a schematic diagram of another embodiment of the fuel cell system of FIG. 3.

In FIG. 7, a further embodiment of a fuel cell system and controller according to the present invention is shown and generally indicated at 90. As shown, fuel cell system 90 includes a fuel processing system 11, which may include any of the embodiments and variations shown and discussed previously. In FIG. 7, fuel processing system controller 32 is shown incorporated into system 11. Similar to the previously discussed embodiments, controller 32 communicates with processor 44 of charge controller 34 via communication line 35.

Also shown in FIG. 7 are the previously discussed step-up converter 43, inverter 40, battery bank 20 and contactors 52 and 54. Controller 32 adjusts the output of step-up converter 43 to prevent the current drawn from the fuel cell stack from exceeding a selected threshold value. As also shown in FIG. 7, controller 32 may communicate with step-up converter 43 via processor 44 and communication line 86. Controller 32 also regulates the flow of hydrogen gas in stream 18 proportional to the current from stack 14 (or another suitable measure of the hydrogen gas consumed in stack 14). Contactors 52 and 54 are adapted to selectively disconnect the ac load to fuel cell stack 14, such as responsive to signals from control system 30.

As discussed, control system 30 may include various sensors. Illustrative examples of suitable sensors are shown in FIG. 7. For example, a sensor 83 is shown measuring electrical power stream 84 produced by system 11, and sensor 83 communicates with processor 44 via communication line 85. Similarly, another sensor 87 is shown measuring the electrical power stream 88 from battery bank 20 and communicating with controller 32.

A suitable inverter 40 is rated at 5.5 kW and produces an output voltage of 110V AC. It should be understood that inverters with other power ratings and output voltages may be used as well, depending for example on the configuration of the devices powered by electrical power from fuel cell stack 14. For example, a second inverter may be used to provide 110/220V AC. In an exemplary system 90, the balance of plant components draw approximately 0.8 kW, thereby leaving at least 4.7 kW to be delivered to facility 22.

A suitable step-up converter 43 delivers up to 3.8 kW of nominal 24-volt dc power from fuel cell stack(s) 14 to battery bank 20. Bank 20 should have a capacity to provide start-up power for system 11 and to provide the necessary additional power during peak outputs. As an example, four 12-volt batteries capable of providing 5 kW for at least an hour have proven effective.

INDUSTRIAL APPLICABILITY

The fuel cell systems and control systems described herein are applicable in any situation where power is to be produced by a fuel cell stack. It is particularly applicable when the fuel cell stack forms part of a fuel cell system that includes a fuel processing assembly that provides a feed for the fuel cell stack.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the claims recite "a" or "a first" element or the equivalent thereof, such claims should be understood to include incorporation of one or more such elements, neither requiring nor excluding two or more such elements.

The following claims recite certain combinations and subcombinations that are directed to one of the disclosed inventions and are believed to be novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A fuel cell system, comprising:
    a fuel processing assembly adapted to produce a feed stream containing hydrogen gas from one or more feedstocks;
    a fuel cell stack including at least one fuel cell, wherein the fuel cell stack is adapted to receive at least a portion of the feed stream and to produce electrical power therefrom, and further wherein the fuel cell stack has a currently available power output;
    a bypass adapted to selectively divert at least a portion of the feed stream from delivery to the fuel cell stack;
    a battery bank adapted to store electrical power, wherein the battery bank has a current level of stored power; and
    a control system adapted to selectively actuate the bypass to control the portion of the feed stream that is diverted from delivery to the fuel cell stack and thereby regulate the rate that the feed stream is delivered to the fuel cell stack, wherein the control system is adapted to selectively actuate the bypass responsive at least in part to an applied load to the fuel cell system and the current level of stored power of the battery bank.

2. The fuel cell system of claim 1, wherein the bypass includes a first configuration, in which none of the feed stream is diverted from delivery to the fuel cell stack, a second configuration in which all of the feed stream is diverted from delivery to the fuel cell stack, and at least one intermediate configuration in which some, but not all, of the feed stream is diverted from delivery to the fuel cell stack.

3. The fuel cell system of claim 1, wherein the control system is adapted to actuate the bypass to selectively divert at least a portion of the feed stream when the applied load does not exceed the currently available power output of the fuel cell stack.

4. The fuel cell system of claim 1, wherein the battery bank has a maximum level of stored power and further wherein the control system is adapted to actuate the bypass to selectively divert at least a portion of the feed stream when the current level of stored power of the battery bank is at least as great as the maximum level of stored power.

5. The fuel cell system of claim 1, wherein the fuel cell system is in communication with at least one facility adapted to apply the applied load to the fuel cell system.

6. The fuel cell system of claim 5, wherein the applied load includes at least one of an electrical load and a thermal load.

7. The fuel cell system of claim 1, wherein the control system is adapted to actuate the bypass without reducing the rate at which the fuel processing assembly produces the feed stream.

8. The fuel cell system of claim 1, wherein the fuel cell system further includes a hydrogen storage device adapted to receive at least a portion of the feed stream diverted by the bypass.

9. The fuel cell system of claim 1, wherein the fuel cell system further includes at least one hydrogen-consuming device that is adapted to receive at least a portion of the feed stream diverted by the bypass.

10. The fuel cell system of claim 9, wherein the at least one hydrogen-consuming device includes a combustion assembly that is adapted to combust a fuel stream, and further wherein the combustion assembly is adapted to receive at least a portion of the feed stream diverted by the bypass.

11. The fuel cell system of claim 10, wherein the combustion assembly includes a combustion chamber that is adapted to heat the fuel cell system.

12. The fuel cell system of claim 1, wherein the fuel processing assembly includes at least one fuel processor adapted to produce the feed stream by steam reforming a feedstock comprising water and at least one of a hydrocarbon and an alcohol.

13. The fuel cell system of claim 12, wherein the fuel processing assembly is adapted to produce a mixed gas stream containing hydrogen gas from the feedstock, and further wherein the fuel processing assembly includes a separation region in which the mixed gas stream is separated into the feed stream and at least one byproduct stream.

14. The fuel cell system of claim 13, wherein the separation region includes a membrane module including at least one hydrogen selective membrane.

15. The fuel cell system of claim 14, wherein the at least one hydrogen selective membrane is formed from at least one of palladium and a palladium alloy.

16. The fuel cell system of claim 1, wherein the fuel processing assembly includes at least one fuel processor adapted to produce the feed stream.

17. The fuel cell system of claim 16, wherein the fuel processing assembly is adapted to produce a mixed gas stream containing hydrogen gas from the feedstock, and further wherein the fuel processing assembly includes a separation region in which the mixed gas stream is separated into the feed stream and at least one byproduct stream.

18. The fuel cell system of claim 2, wherein the control system is adapted to actuate the bypass to selectively divert at least a portion of the feed stream when the applied load does not exceed the currently available power output of the fuel cell stack.

19. The fuel cell system of claim 2, wherein the battery bank has a maximum level of stored power and further wherein the control system is adapted to actuate the bypass to selectively divert at least a portion of the feed stream when the current level of stored power of the battery bank is at least as great as the maximum level of stored power.

20. The fuel cell system of claim 2, wherein the fuel cell system is in communication with at least one facility adapted to apply the applied load to the fuel cell system, and further wherein the applied load includes at least one of an electrical load and a thermal load.

21. The fuel cell system of claim 2, further comprising at least one hydrogen-consuming device that includes a combustion assembly that is adapted to combust a fuel stream, and further wherein the combustion assembly is adapted to receive at least a portion of the feed stream diverted by the bypass, and further wherein the combustion assembly is adapted to heat at least a portion of the fuel processing assembly.

22. The fuel cell system of claim 2, wherein the fuel processing assembly includes at least one fuel processor adapted to produce the feed stream.

23. The fuel cell system of claim 22, wherein the fuel processing assembly is adapted to produce a mixed gas stream containing hydrogen gas from the feedstock, and further wherein the fuel processing assembly includes a separation region in which the mixed gas stream is separated into the feed stream and at least one byproduct stream.

24. The fuel cell system of claim 2, wherein the fuel processing assembly includes at least one fuel processor adapted to produce the feed stream by steam reforming a feedstock comprising water and at least one of a hydrocarbon and an alcohol.

25. The fuel cell system of claim 24, wherein the fuel processing assembly is adapted to produce a mixed gas stream containing hydrogen gas from the feedstock, and further wherein the fuel processing assembly includes a separation region in which the mixed gas stream is separated into the feed stream and at least one byproduct stream.

26. A fuel cell system, comprising:
  a fuel processing assembly adapted to produce a feed stream containing hydrogen gas from one or more feedstocks;
  a fuel cell stack including at least one fuel cell, wherein the fuel cell stack is adapted to receive at least a portion of the feed stream and to produce electrical power therefrom, and further wherein the fuel cell stack has a currently available power output;
  a battery bank adapted to store electrical power, wherein the battery bank has a current level of stored power;
  a bypass adapted to selectively divert at least a portion of the feed stream from delivery to the fuel cell stack; and
  a control system adapted to selectively actuate the bypass to control the portion of the feed stream that is diverted from delivery to the fuel cell stack and thereby regulate the rate that the feed stream is delivered to the fuel cell stack, wherein the control system is adapted to selectively actuate the bypass responsive at least in part to the current level of stored power of the battery bank.

27. The fuel cell system of claim 26, wherein the bypass includes a first configuration, in which none of the feed stream is diverted from delivery to the fuel cell stack, a second configuration in which all of the feed stream is diverted from delivery to the fuel cell stack, and at least one intermediate configuration in which some, but not all, of the feed stream is diverted from delivery to the fuel cell stack.

28. The fuel cell system of claim 26, wherein the battery bank has a maximum level of stored power and further wherein the control system is adapted to actuate the bypass to selectively divert at least a portion of the feed stream when the current level of stored power of the battery bank is within a selected range of the maximum level of stored power.

29. The fuel cell system of claim 26, wherein the battery bank has a maximum level of stored power and further wherein the control system is adapted to actuate the bypass to selectively divert at least a portion of the feed stream when the current level of stored power of the battery bank is at least as great as the maximum level of stored power.

30. The fuel cell system of claim 26, wherein the control system is adapted to actuate the bypass without reducing the rate at which the fuel processing assembly produces the feed stream.

31. The fuel cell system of claim 26, wherein the fuel cell system further includes a hydrogen storage device adapted to receive at least a portion of the feed stream diverted by the bypass.

32. The fuel cell system of claim 26, wherein the fuel cell system further includes a hydrogen-consuming device that is adapted to receive at least a portion of the feed stream diverted by the bypass.

33. The fuel cell system of claim 26, wherein the battery bank has a maximum level of stored power and further wherein the control system is adapted to actuate the bypass to selectively divert at least a portion of the feed stream when the current level of stored power of the battery bank is at least as great as the maximum level of stored power.

34. The fuel cell system of claim 26, wherein the fuel cell system is in communication with at least one facility adapted to apply the applied load to the fuel cell system, and further wherein the applied load includes at least one of an electrical load and a thermal load.

35. The fuel cell system of claim 26, further comprising at least one hydrogen-consuming device that includes a combustion assembly that is adapted to combust a fuel stream, and further wherein the combustion assembly is adapted to receive at least a portion of the feed stream diverted by the bypass, and further wherein the combustion assembly is adapted to heat at least a portion of the fuel processing assembly.

36. The fuel cell system of claim 26, wherein the fuel processing assembly includes at least one fuel processor adapted to produce the feed stream.

37. The fuel cell system of claim 36, wherein the fuel processing assembly is adapted to produce a mixed gas stream containing hydrogen gas from the feedstock, and further wherein the fuel processing assembly includes a separation region in which the mixed gas stream is separated into the feed stream and at least one byproduct stream.

38. The fuel cell system of claim 26, wherein the fuel processing assembly includes at least one fuel processor adapted to produce the feed stream by steam reforming a feedstock comprising water and at least one of a hydrocarbon and an alcohol.

39. The fuel cell system of claim 38, wherein the fuel processing assembly is adapted to produce a mixed gas stream containing hydrogen gas from the feedstock, and further wherein the fuel processing assembly includes a separation region in which the mixed gas stream is separated into the feed stream and at least one byproduct stream.

* * * * *

UNITED STATES PATENT AND TRADEMARK OFFICE
CERTIFICATE OF CORRECTION

PATENT NO. : 6,979,507 B2
APPLICATION NO. : 10/304786
DATED : December 27, 2005
INVENTOR(S) : David J. Edlund, Thomas G. Herron and Craig F. Holmes It is certified that error appears in the above-identified patent and that said Letters Patent is hereby corrected as shown below:

ON THE TITLE PAGE:
Under "Related U.S. Application Data" insert Item --(60) Provisional application No. 60/145,900, filed on Jul. 27, 1999.--

IN THE SPECIFICATION:
Column 1, line 9, delete "the complete disclosure of which is hereby incorporated by reference for all purposes." and insert --which claims priority to U.S. Provisional Patent Application Serial No. 60/145,900, which was filed on July 27, 1999, and is entitled "Fuel Cell Control System." The complete disclosure of U.S. Patent No. 6,495,277 is hereby incorporated by reference for all purposes.--

Signed and Sealed this

Thirty-first Day of August, 2010

David J. Kappos
*Director of the United States Patent and Trademark Office*